Dec. 6, 1955    W. V. THELANDER ET AL    2,725,966
FRICTION CLUTCH PLATES
Filed Nov. 1, 1951    2 Sheets-Sheet 1
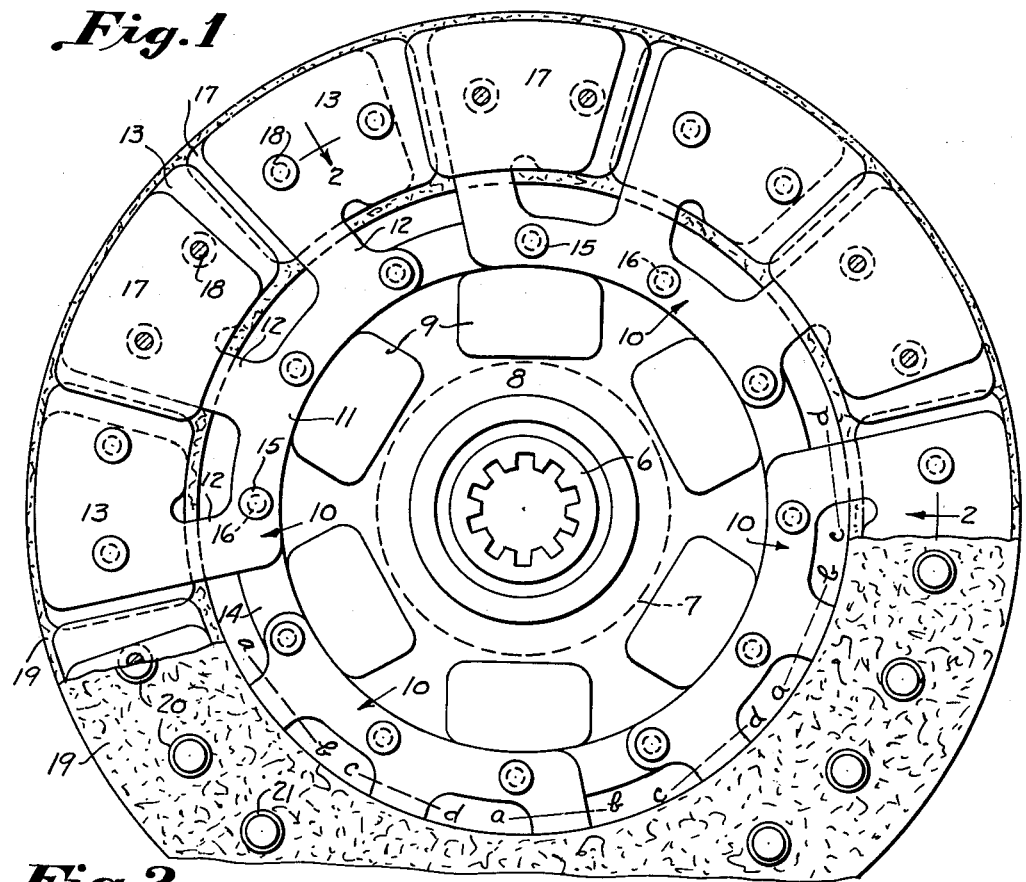
Fig.1
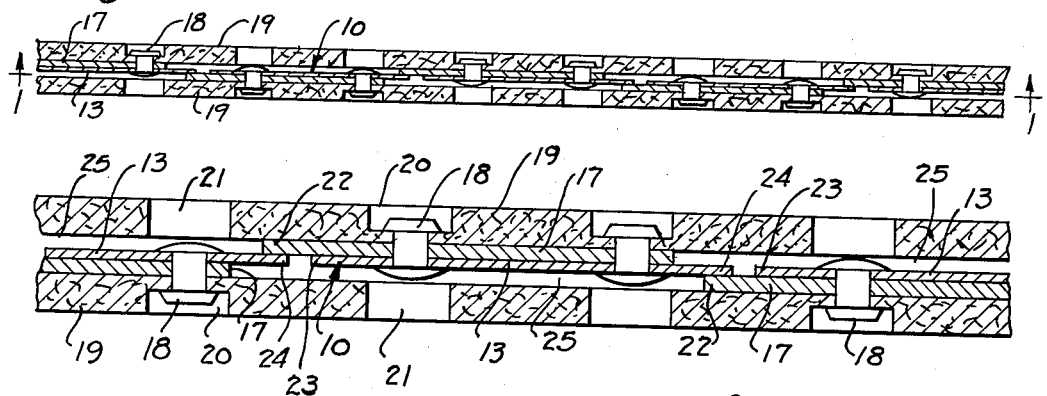
Fig.2
Fig.3
Inventors
W. VINCENT THELANDER
LAWRENCE C. WITKER
Atty.

Dec. 6, 1955  W. V. THELANDER ET AL  2,725,966
FRICTION CLUTCH PLATES
Filed Nov. 1, 1951  2 Sheets-Sheet 2

*Inventors*
W. VINCENT THELANDER
LAWRENCE C. WITKER
*Atty.*

2,725,966

FRICTION CLUTCH PLATES

W. Vincent Thelander, Toledo, and Lawrence C. Witker, Swanton, Ohio, assignors to Dana Corporation, Toledo, Ohio, a corporation of Virginia Application November 1, 1951, Serial No. 254,372

9 Claims. (Cl. 192—107)

This invention relates to improvements in friction clutch plates, and is more particularly concerned with the so-called "mush" construction used in cushion type clutch plates, namely, the peripheral cushion portion of the plates on which the friction facing material is carried with freedom for the opposed facings to yield under a predetermined resistance for smoother clutch engagement and freedom from grabbing and chattering.

Thelander Patent 2,524,146 discloses a cushion type clutch plate in which there are two parallel series of flexible resilient plate sections concentrically arranged relative to and mounted on the hub member to turn with it, the cushion plate sections of each series being circumferentially spaced, and the cushion plate sections of one series being arranged in staggered relation to the cushion plate sections of the other series, so that the cushion plate sections of the two series can be flexed toward one another in the compacting of the plate in the engagement of the clutch, the adjoining lateral edge portions of the plate sections, which are disposed in overlapping relation, being flexed to resist compacting with a substantially uniform build-up rate, which ensures smoothness of power take-up and comparative freedom from slippage. In that patent, spacers are disclosed mounted on the outer side of both series of cushion plate sections, leaving more than the overlapping edge portions uncovered and free to be flexed for the cushion action, the rings of friction facing material being mounted on the outer sides of the two series of cushion plate sections and spaced therefrom by these spacers.

It is the principal object of our invention to provide improved friction clutch plates of that general design, the present improvements being in the following directions:

(1) The cushion plate sections are all arranged in one plane instead of in overlapping relation to one another, thus permitting blanking of a group of sections, or even a full circle of them, in one piece, although from an economy standpoint a quarter circle or, at the most, a half circle is considered the most practical;

(2) The coplanar arrangement of the cushion plate sections makes possible the coplanar arrangement of their attaching portions instead of having them in overlapping relation, thus making a flatter plate and one that will run more nearly true;

(3) The coplanar arrangement of the cushion plate sections also obviates the necessity for crimping the sections transversely, either at their attaching portions or at their overlapping portions, to keep the neighboring plate sections in tight contact, and (4) Only one-half as many spacers are required in a plate made in accordance with the present invention, because the spacers are arranged in staggered relation, alternate ones being arranged in circumferentially spaced relation on one side of the cushion plate sections fastened to alternate sections, and the intermediate ones being disposed on the other side of the cushion plate sections in circumferentially spaced relation and fastened to the intermediate plate sections, the spacers being arranged so that each spacer spaces its associated cushion plate section relative to the friction facing material and extends in a circumferential direction from one edge of the plate section far enough to be overlapped by the edge portion of the adjoining plate section to flex the latter in one direction in the compacting of the plate, the other edge portion of the plate section with which the spacer is associated being flexed in the opposite direction by a similarly overlapping spacer associated with the other neighboring cushion plate section.

Referring to the accompanying drawings—

Fig. 1 is a rear view of a clutch plate made in accordance with our invention, the lower portion of the plate being broken away to conserve space, and a portion of one friction facing ring being broken away better to illustrate the mush construction, the latter being viewed on the line 1—1 of Fig. 2;

Fig. 2 is a section on the arcuate line 2—2 of Fig. 1;

Fig. 3 is an enlargement of a portion of Fig. 2;

Similar reference numerals are applied to corresponding parts throughout the views.

Figure 4:
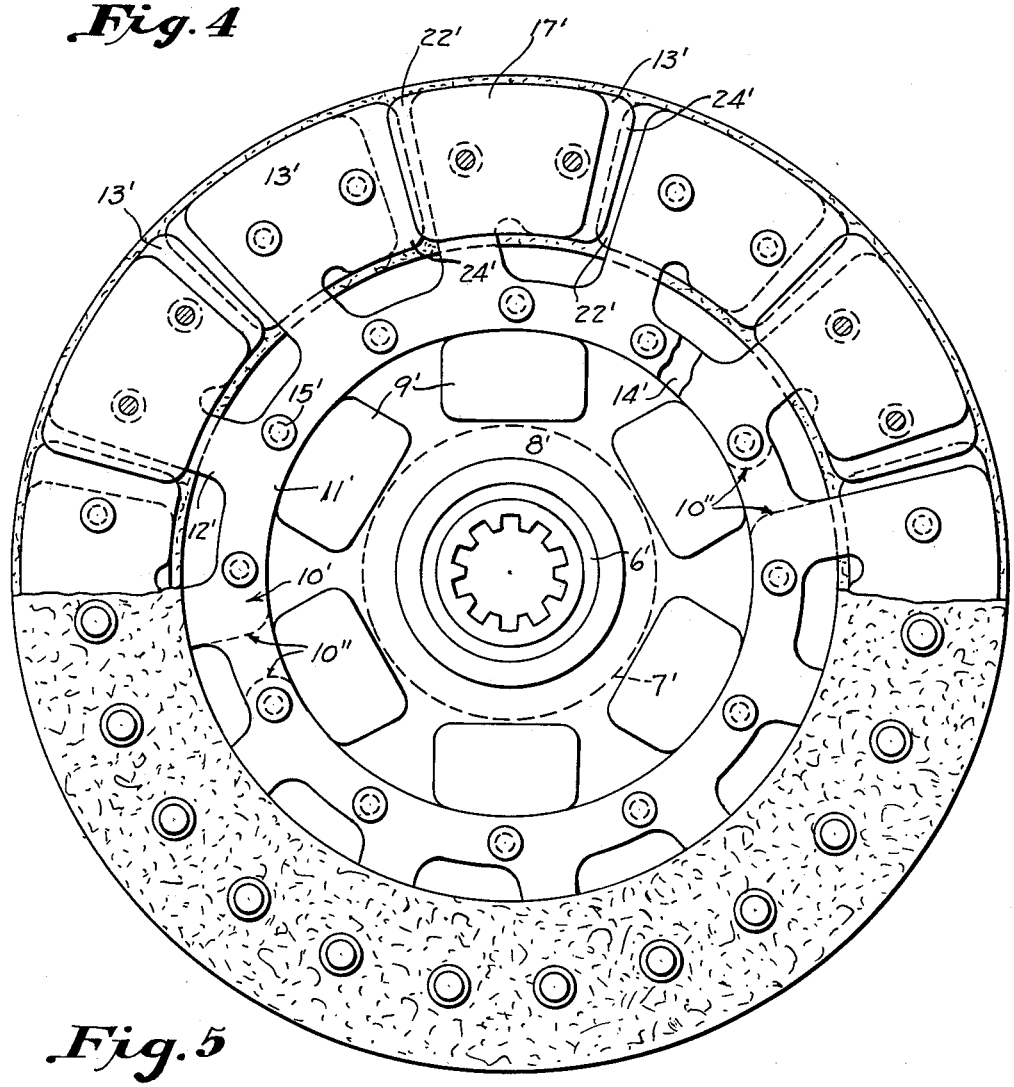
Fig. 4 is a view similar to Fig. 1, showing a modified or alternative construction.

Referring first to Figs. 1 to 3, the clutch plate shown comprises relatively rotatable inner and outer portions, the inner portion being formed by a center hub 6 splined for driving connection with the driving shaft of an automotive transmission and provided with an annular flange 7 onto which a notched plate is riveted for oscillatory movement with the hub relative to the housing plates 8, in which pockets 9 are formed containing spring cushioning assemblies, so that when the relative movement occurs between the hub 6 and housing plates 8, the springs of said assemblies are compressed lengthwise to cushion the drive and absorb vibrations, as well known in this art.

The outer portion of the plate contains the mush construction with which our invention is particularly concerned. There are four spring steel stampings, indicated generally by the reference numeral 10, each stamping consisting of an arcuate attaching portion 11 with three lugs 12 extending radially outwardly therefrom in equally circumferentially spaced relation, each terminating in a circumferentially elongated enlarged cushion portion 13. The portions 11, 12, and 13 are all in coplanar relation. The stampings 10 are riveted, or otherwise suitably secured, to the radially outer rim portion 14 of the housing plates 8, as indicated at 15, the rivets 15 being entered through registering holes 16 in the rim portion 14 and attaching portion 10. Segmental-shaped, stamped, sheet metal spacers 17 are riveted to the cushion portions 13, as indicated at 18, two rivets being provided per spacer and associated cushion portion and being entered through registering holes in the spacer and cushion portion and through registering holes in the friction facing rings or pads 19 that engage the outer faces of the spacers 17, as clearly appears in Figs. 2 and 3. The heads of the rivets 18 fit in countersunk holes 20 provided therefor in the facings 19, and there are holes 21 in the facings opposite the heads on the other ends of the rivets 18, so that the rivets will not interfere with close compacting of the outer cushioning portion of the plate when the clutch is engaged. The spacers 17, which have been described as, and are preferably, of sheet metal, may, however, be of a non-metallic or plastic material. When sheet metal is used, aluminum is preferred, because of its lightness, thus reducing the flywheel effect. These spacers 17 are provided one for each cushion portion 13 and are arranged in circumferentially spaced relation to one another alternately on opposite sides of the stampings 10, as best appears in Figs. 2 and 3. Each spacer has one end portion 22 extending in a circumferential direction beyond the lateral edge portion 23 of its associated cushion 13, and has the lateral edge portion 24 of the neighboring cushion 13 overlapping the same, so that the spacer is adapted to flex the portion 24 in one direction to resist compacting of the plate in the engagement of the clutch. In like manner, the other lateral edge portion 24 of the same cushion 13 associated with the spacer 17 mentioned overlaps the end 22 of the spacer 17 associated with the other neighboring cushion 13, so that this edge portion 24 is adapted to be flexed in the opposite direction to resist compacting of the plate in the engagement of the clutch.

In operation it should be clear that when the pressure plate is moved toward the flywheel in the engagement of the clutch, the facings 19 are pressed together, thereby flexing the edge portions 24 of the cushions 13 between the adjoining ends of the spacers 17. The build-up rate is substantially uniform in the packing together of the parts in the engagement of the clutch, due to the fact that the cushions 13 act as so many leaf springs, which are flexed to resist the compacting of the plate, and their end portions 24 overlap the end portions 22 of the spacers 17 to such a small extent that there can be only simple springboard-like flexing of these edge portions 24. As a result, there is greater smoothness of power take-up and comparative freedom from slippage with the present mush construction. The thickness of the spacers 17 and the spacing of the spacers circumferentially together determine the extent to which the overlapped portions 24 of the cushions 13 are flexed, and, if desired, these spacers may be increased or decreased in thickness to increase or decrease the ultimate cushioning pressure. The width of overlap at 22—24 is also a factor in determining the ultimate spring pressure obtainable in this mush construction, as is also the width of the edge portion 24 that is left uncovered by the spacer 17 for flexing. This design, therefore, permits "tailoring" the plate to the specific requirements of a given engine, to obtain a softer or harder engagement as needed. The fact that the entire cushion portions 13 are of spring material ensures good spring-back throughout the circumference of the cushioning portion of the plate every time the clutch is disengaged, thus avoiding likelihood of the plate taking a set. The stampings 10 being flat can be produced at low cost in quantity production to the desired uniformity so far as spring characteristics are concerned, and that also makes for uniform thickness of the cushioning portion and uniform wear on the facings. The coplanar relationship of the cushions 13 and the coplanar relationship of their attaching portions 11 account for the plate as a whole being flatter and running more nearly true. Furthermore, while the coplanar construction of the stampings 10 generally ensures good enough contact between the spacer 17 and the cushions 13 at their overlapped portions 22 and 24 so that transverse crimping should not be necessary, we may crimp the stampings 10 transversely of the radially inner ends of the legs 12 alternately in opposite directions along the lines a—b and c—d, indicated in Fig. 1, so that the edge portions 24 of the cushions 13 are pressed into tight engagement with the end portions 22 of the spacers 17 which they overlap, thereby ensuring a flatter and more nearly true-running plate than would be possible without such good contact. The space left between one side of each cushion 13 and the opposed facing 19, as indicated at 25, provides ventilation for the plate.

In Fig. 4 a one-piece ring-shaped stamping 10' is indicated, the same providing a continuous ring-shaped attaching portion 11' from which leg portions 12' extend radially outwardly in equally circumferentially spaced relation carrying the cushion portions 13' on their outer ends. These cushion portions 13' are circumferentially spaced, the same as the cushions 13 in Figs. 1 to 3, and have spacers 17' associated therewith in the same way, that is one spacer per cushion, the spacers being in staggered relation alternately on opposite sides of the stamping 10'. The spacers 17' have end portions 22' in overlapping relation to lateral edge portions 24' of neighboring cushions, so that the same flexing action is obtained, to resist compacting of the plate in the engagement of the clutch, as described above in reference to Figs. 1 to 3. In other words, the same operation is obtained and substantially the same advantages, except that this one-piece circular stamping 10' involves more wasted metal and is, therefore, more expensive. On the other hand, a lower labor cost is involved in the handling of a single stamping 10' as compared with the handling of four stampings 10 per plate, and somewhat closer uniformity in quantity production is believed to be obtainable with such a construction. While we have shown the same number of rivets 15' fastening the stamping 10' to the rim portion 14' of the housing 8' on the hub 6', it is obvious that the one-piece construction would not necessitate the use of as many rivets as the four-piece construction shown in Fig. 1. To reduce the cost appreciably and yet obtain substantially the same advantages, the stamping could be made in two halves divided diametrically, as indicated by the dotted ends at 10" in Fig. 4.

Figure 5:
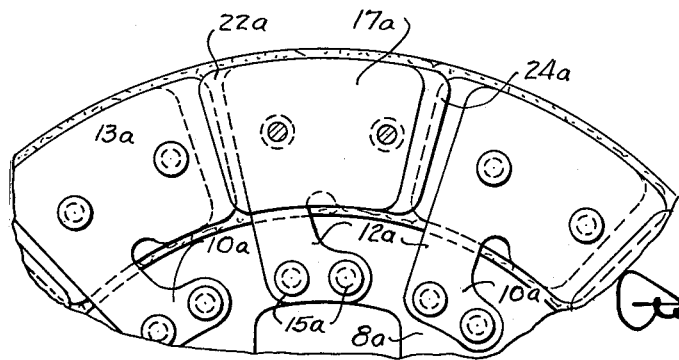
Fig. 5 is a fragmentary view corresponding to a portion of either Fig. 1 or Fig. 4, illustrating still another modified or alternative construction.

On the other hand, it should be understood that as an opposite extreme to the one-piece construction of the stamping 10', a plate similar in design to the plates herein described could be made with stampings 10a, as shown in Fig. 5, each stamping providing only a single cushion 13a on the end of a leg 12a that extends radially outwardly from an attaching portion 11a. Each attaching portion 11a has two rivets 15a fastening the same to the rim 14a of the housing structure 8a. There again the spacers 17a cooperate with the cushions 13a in the same manner as in the constructions disclosed in Figs. 1 and 4, edge portions 24a of the cushions 13a being arranged to be flexed by reason of their overlapping relation to the end portions 22a on the spacers 17a associated with the neighboring cushions, so as to resist compacting of the plate in the engagement of the clutch. The same advantages as to flatness of plate and running-true, and so forth, are obtained with this construction as with the others.

It is believed the foregoing description conveys a good understanding of the objects and advantages of our invention. The appended claims have been drawn to cover all legitimate modifications and adaptations.

We claim:

1. In a friction clutch plate, a hub member, a series of flexible resilient cushion plate sections disposed in closely circumferentially spaced coplanar relationship concentrically relative to and mounted on said hub member to turn therewith, said cushion plate sections adapted to be flexed to resist compacting of the plate, rings of friction facing material disposed in spaced parallel relationship to opposite sides of said cushion plate sections, and a series of spacer plates, alternate ones of said series of spacer plates engaging alternate ones of said series of cushion plate sections and arranged on one side of the series of cushion plate sections to space one of said rings of facing material relative thereto, and intermediate ones of said series of spacer plates engaging intermediate ones of said series of cushion plate sections and arranged on the other side of said series of cushion plate sections to space the other ring of facing material relative thereto, the said alternate cushion plate sections being secured with their spacer plates to the one ring of facing material, and the said intermediate cushion plate sections being secured with their spacer plates to the said other ring of facing material, all of said spacer plates leaving uncovered one fairly wide side edge portion of said cushion plate sections, and said spacer plates all extending laterally in one direction circumferentially of the plate beyond the other side edge portion of said cushion plate sections and overlapping to some extent the uncovered side edge portion of the adjoining cushion plate sections, whereby these uncovered side edge portions are flexed in the compacting of the plate to resist such compacting, the said alternate cushion plate sections being flexed in one direction and the said intermediate cushion plate sections being flexed in the opposite direction when the clutch plate is compacted.

2. In a friction clutch plate, a hub member, a series of coplanar, circumferentially spaced, flexible, resilient cushion plate sections that are generally L-shaped, having one leg of the L substantially radially disposed relative to the hub and secured thereto at the inner end, and having the other leg of the L extending laterally relative to the outer end circumferentially of the clutch plate, said cushion plate sections having their opposite faces substantially flat and normally parallel, said cushion plate sections being adapted to be flexed at one end portion of the last named leg of the L to resist compacting of the clutch plate, a spacer plate for each cushion plate section carried on the one face of the last named leg of the L extending circumferentially of the clutch plate from a radial line spaced from the one end of said leg of the L past the other end of that leg of the L far enough to overlap to a small extent the extremity of the corresponding leg of the L of the next cushion plate section, alternate ones of said spacer plates being so disposed on one face of alternate ones of said cushion plate sections, intermediate ones of said spacer plates being correspondingly disposed on the other face of intermediate ones of said cushion plate sections, and friction pads secured to the outer faces of said spacer plates.

3. In a friction clutch plate, a hub member, a series of independently flexible resilient cushion plate sections disposed in closely circumferentially spaced coplanar relationship concentrically relative to and mounted on said hub member to turn therewith, said cushion plate sections adapted to be flexed to resist compacting of the plate, a series of spacer plates, one associated with each cushion plate section and secured thereto, alternate ones of said series of spacer plates being associated with alternate ones of said cushion plate sections and arranged on one side of the series of cushion plate sections, intermediate ones of said series of spacer plates being associated with intermediate ones of said cushion plate sections and arranged on the other side of the series of cushion plate sections, all of said spacer plates leaving uncovered one fairly wide side portion of said cushion plate sections, and said spacer plates all extending laterally in one direction circumferentially of the plate beyond the other side edge portion of said cushion plate sections and overlapping to some extent the uncovered side edge portion of the adjoining cushion plate sections, whereby these uncovered side edge portions are flexed in the compacting of the plate to resist such compacting, the said alternate cushion plate sections being flexed in one direction and the said intermediate cushion plate sections being flexed in the opposite direction when the clutch plate is compacted, and friction pads secured to the outer faces of said spacer plates.

4. A friction clutch plate as set forth in claim 2, wherein a plurality of said cushion plate sections are provided as integral portions of one flat plate having a single, circumferentially elongated, radially inner connecting portion adapted to be secured to said hub member.

5. A friction clutch plate as set forth in claim 2, wherein the complete circular set of cushion plate sections are provided as integral portions of one flat plate having a single, annular, radially inner connecting portion adapted to be secured to said hub member.

6. A friction clutch plate as set forth in claim 3, wherein a plurality of said cushion plate sections are provided as integral portions of one flat plate having a single, circumferentially elongated, radially inner portion adapted to be secured to said hub member.

7. A friction clutch plate as set forth in claim 3, wherein the complete circular set of cushion plate sections are provided as integral portions of one flat plate having a single, annular, radially inner portion adapted to be secured to said hub member.

8. In a friction clutch plate, a hub member, a series of coplanar, circumferentially spaced, flexible, resilient cushion plate sections that are generally L-shaped, having one leg of the L substantially radially disposed relative to the hub and secured thereto at the inner end, and having the other leg of the L extending laterally relative to the outer end circumferentially of the clutch plate, said cushion plate sections having their opposite faces substantially flat and normally parallel, said cushion plate sections being adapted to be flexed at one end portion of the last named leg of the L to resist compacting of the clutch plate, a spacer plate for each cushion plate section carried on the one face of the last named leg of the L extending circumferentially of the clutch plate from a radial line spaced from the one end of said leg of the L past the other end of that leg of the L far enough to overlap to a small extent the extremity of the corresponding leg of the L of the next cushion plate section, alternate ones of said spacer plates being so disposed on one face of alternate ones of said cushion plate sections, intermediate ones of said spacer plates being correspondingly disposed on the other face of intermediate ones of said cushion plate sections, and rings of friction facing material disposed in spaced parallel relationship to opposite sides of said cushion plate sections and secured to the outer faces of said spacer plates.

9. In a friction clutch plate, a hub member, a series of flexible resilient cushion plate sections disposed in closely circumferentially spaced normally coplanar relationship concentrically relative to and mounted on said hub member to turn therewith, said cushion plate sections being adapted to be flexed into substantially parallel planes to resist compacting of the plate, friction facing material disposed in spaced parallel relationship to opposite sides of said cushion plate sections, and a series of spacer plates, alternate ones of said series of spacer plates engaging alternate ones of said series of cushion plate sections and arranged on one side thereof and secured thereto with the facing material on that side to space the latter relative to said cushion plate sections, and intermediate ones of said series of spacer plates engaging the intermediate ones of said series of cushion plate sections and arranged on the other side thereof and secured thereto with the facing material on that side to space the latter relative to said cushion plate sections, all of said spacer plates leaving uncovered one fairly wide side edge portion of said cushion plate sections, and said spacer plates all extending laterally in one direction circumferentially of the plate beyond the other side edge portion of said cushion plate sections and overlapping to some extent the uncovered side edge portion of the adjoining cushion plate sections, whereby these uncovered side edge portions are flexed in the compacting of the plate to resist such compacting, the said alternate cushion plate sections being flexed in one direction and the said intermediate cushion plate sections being flexed in the opposite direction when the clutch plate is compacted.

References Cited in the file of this patent
UNITED STATES PATENTS

| | | |
|---|---|---|
| 1,594,438 | Whitacre | Aug. 3, 1926 |
| 1,603,295 | Ruesenberg | Oct. 19, 1926 |
| 1,981,505 | Goodwin | Nov. 20, 1934 |
| 2,299,028 | Nutt et al. | Oct. 13, 1942 |
| 2,524,146 | Thelander | Oct. 3, 1950 |